United States Patent [19]
Perara
[11] Patent Number: 4,510,803
[45] Date of Patent: Apr. 16, 1985

[54] FLIGHT RECORDER HAVING CAPABILITY OF STORING INTERMEDIATE DATA

[75] Inventor: Thomas E. Perara, Union, N.J.
[73] Assignee: Allied Corporation, Morris Township, Morris County, N.J.

[21] Appl. No.: 453,554
[22] Filed: Dec. 27, 1982
[51] Int. Cl.[3] .......... G06F 15/50
[52] U.S. Cl. .......... 73/178 R; 340/870.28; 340/870.11
[58] Field of Search .......... 73/178 R, 178 T, 178 H; 244/194, 164; 364/550, 551, 579, 580; 340/27, 870.28, 870.11

[56] References Cited

U.S. PATENT DOCUMENTS 3,051,948 8/1962 De Faymoreau .......... 340/870.28 X
3,357,007 12/1967 Wike .......... 340/870.28 X
3,611,332 7/1969 Slater .......... 340/870.28 X
3,760,268 9/1973 Ruhnke .......... 340/870.28 X
4,031,513 11/1974 Simciak .......... 340/870.28 X

*Primary Examiner*—Donald O. Woodiel
*Assistant Examiner*—E. Harding
*Attorney, Agent, or Firm*—Stanley N. Protigal

[57] ABSTRACT

A flight recorder (11) for a vehicle such as an airborne vehicle is provided in which various data is recorded, along with on-board time data (from 38) in order to be processed by ground based equipment (13). The on-board time data is synchronized by using a telemetry signal (DT) which is received by a ground based tracking system so that the timing of the events recorded by the flight recorder (11) may be synchronized with the timing of events recorded by the ground based tracking system. This combined data is provided to the ground based equipment (13) in order that the data at (12) obtained on-board the vehicle can be analyzed. By the use of digital techniques, various measurements, such as acceleration and angular rate may be accurately stored and reproduced. This arrangement reduces repeat costs for multiple tests and increases reliability of test data.

13 Claims, 5 Drawing Figures

FLIGHT RECORDER HAVING CAPABILITY OF STORING INTERMEDIATE DATA

BACKGROUND OF THE INVENTION

This invention relates to a flight recorder used to provide information concerning the flight of a vehicle. In particular, the flight recorder is used to obtain data from the vehicle in order to provide and record accurate data during testing of the vehicle.

In certain applications, it is desired that a high degree of programmed guidance accuracy be accomplished without reliance on external information during flight of a vehicle. The accuracy of the guidance program must be assessed in order to determine the validity of the guidance program. The ability of external sensors, such as radar and photography, to determine such factors as vehicle attitude and speed does not meet accuracy requirements. For this reason, information concerning the vehicle's flight is recorded in flight during testing of the vehicle.

Further, for security reasons, it is important that the data contained in the flight recorder be incomplete and unuseable without other information and data which is not contained in the recorder.

Still further it is important that there be some flexibility in the sequence of events recorded during the test in order to monitor these events. For example, if the vehicle's mission is varied so as to change its flight during exercise of a manuever, it may be necessary to record data at times during a test other than the times contemplated during design of the test equipment.

Accordingly, it is an object of the invention to provide a flight recorder for an airborne vehicle which is able to inexpensively and reliably record flight information so that the performance of the vehicle can be determined with a high degree of precision and which can be modified in a simple and inexpensive fashion to modify the type of data being recorded during any particular part of the flight.

It is a further object of the invention to provide a flight recorder of the type described which contains information usable only with the benefit of additional information developed externally of the flight recorder.

SUMMARY OF THE INVENTION

In accordance with this invention, test equipment for testing the flight on an airborne vehicle is provided in which a first component is carried on board the vehicle and a second ground based component extracts data from the first component to provide an indication of flight conditions. The first component records data from a plurality of measurements and provides a time base for these measurements with reference to a distinct telemetry signal. The second component is provided with information concerning the relationship between launch and the first telemetry signal and extracts information from the measurements recorded by the first component. The measurements of the first component include representations of acceleration and rate, as measured in three vectors as well as vehicle guidance information and information relating to the performance of predetermined events. The second component is able to extract information relating to velocity, acceleration, attitude, relative position and the performance of predetermined events from information recorded by the first component and is able to relate it to the time base. Additionally, the information provided by the first component is not usable without the addition of information which is separately provided to the second component, thereby giving a degree of security to information concerning the flight of the vehicle.

DETAILED DESCRIPTION OF THE PREFERRED EMBODIMENT

Figure 1:
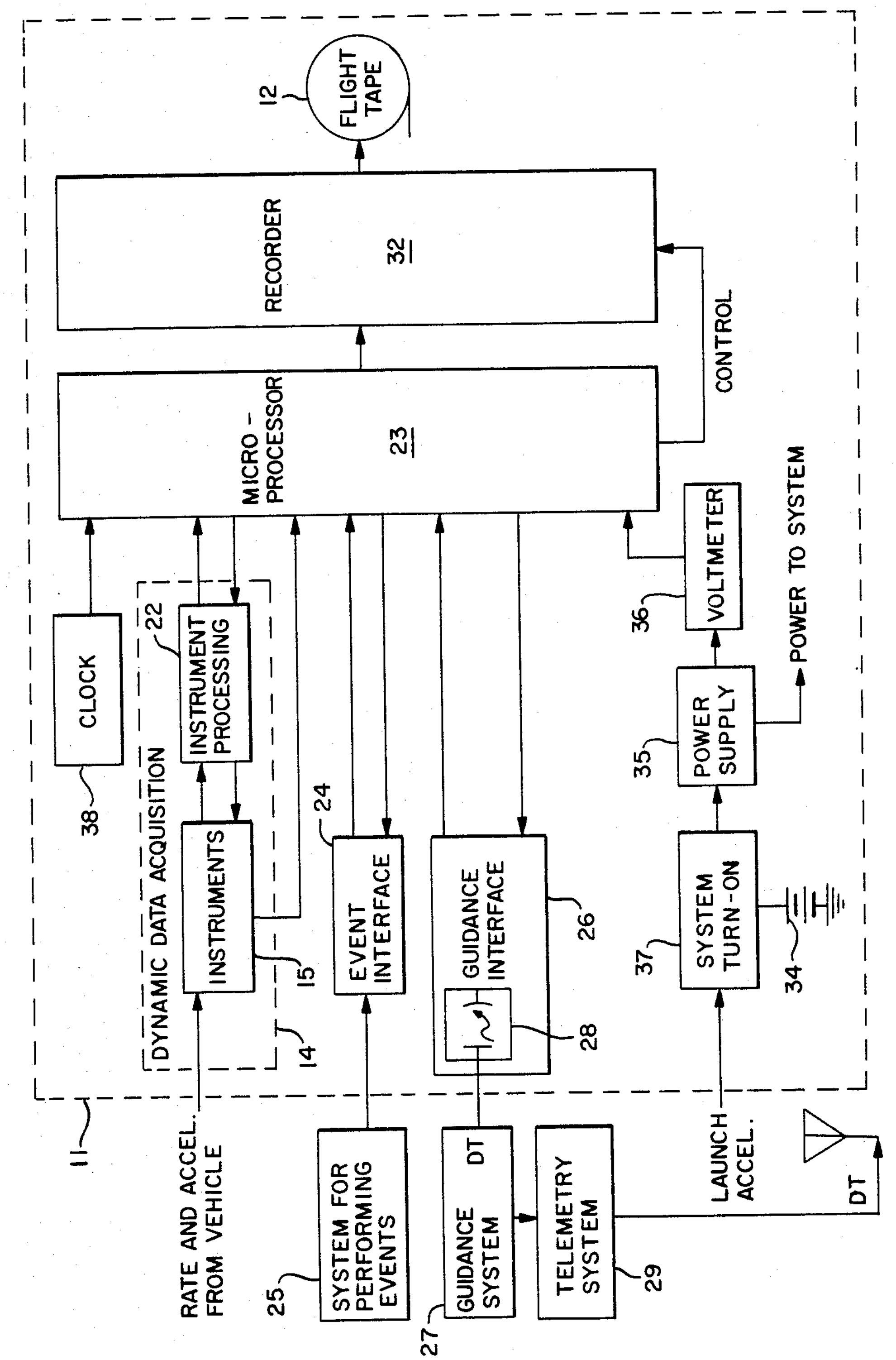
FIG. 1 is a block diagram showing the operation of an on-board component carried by a flight vehicle, in accordance with the invention.
Figure 2:
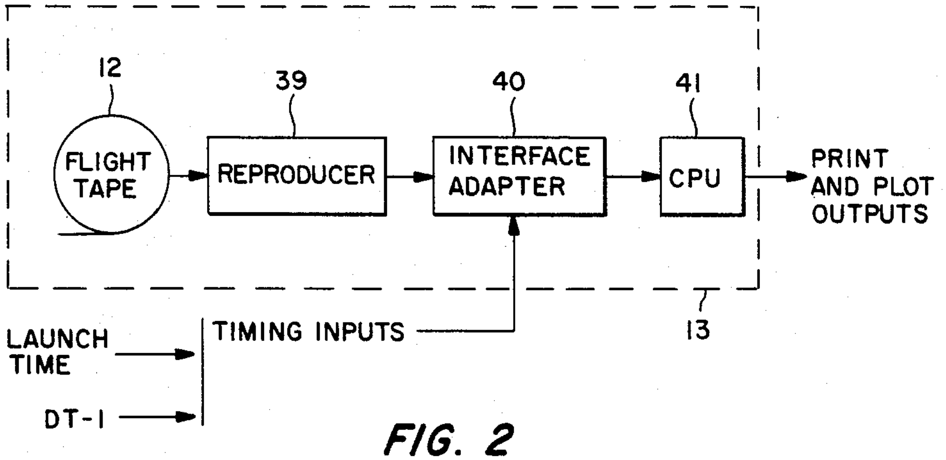
FIG. 2 is a block diagram showing the operation of a ground based component in accordance with the invention.

Apparatus for testing, for purposes of illustration, a flight vehicle is shown in FIGS. 1 and 2. The apparatus shown in FIG. 1 is disposed on board the vehicle and consists of a flight recorder 11 which records data on a tape 12. The data on tape 12 is transferred to a ground-based data analyzer 13 whose purpose it is to interpret the data stored on the tape 12 to provide raw data for analysis purposes.

With particular reference to FIG. 1, rate and acceleration information is provided by a dynamic data acquisition section 14 which senses the vehicle's turn rate and acceleration with plural gyro and accelerometer instruments represented by block 15. Block 15 includes low-level rate gyros 19 (shown in FIG. 3) which are tri-axial mounted devices, providing roll, pitch and yaw information. Also included in block 15 are high level rate gyros (not separately shown) to provide the same information but with a capability of providing a larger rate. If any axis of the low-rate gyros 19 saturates during a separation phase, information from the high-rate gyros will be used by the ground based analyzer 13 to calculate the vehicle's attitude. Rate gyros are well known in the art of flight vehicle guidance and therefore will not be structurally described here. Also included in block 15 are accelerometers 16 (see FIG. 3) which are tri-axial mounted devices.

Figure 3:
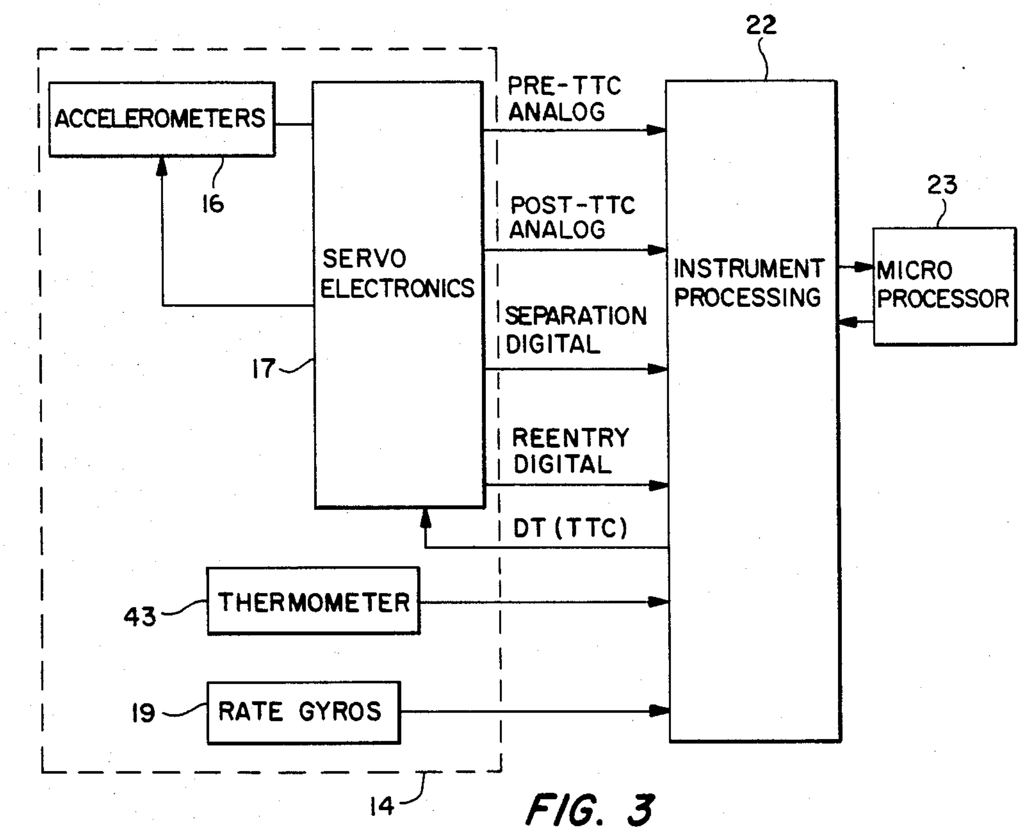
FIG. 3 is a block diagram showing a circuit for receiving dynamic data in accordance with the invention.

Referring to FIG. 3, accelerometers 16 are connected to a servo electronics circuit 17 which provides torquer signals required to complete the accelerometer servo loops. The servo electronics circuit 17 also provides analog and digital outputs at different levels of acceleration. Thus, the accelerometers 17 are able to function at different levels of acceleration to give outputs ranging from very high acceleration values to less than 100 $\mu$G's.

The accelerometers 16 and the servo electronics circuit 17 are preferably contained in Systron Donner Model 5620-100-P2 accelerometer, available from Systron Donner, Company, Intertial Division, Concord, Calif. This unit senses acceleration and processes the information in a special servo loop, shown in block form in FIG. 4.

Figure 4:
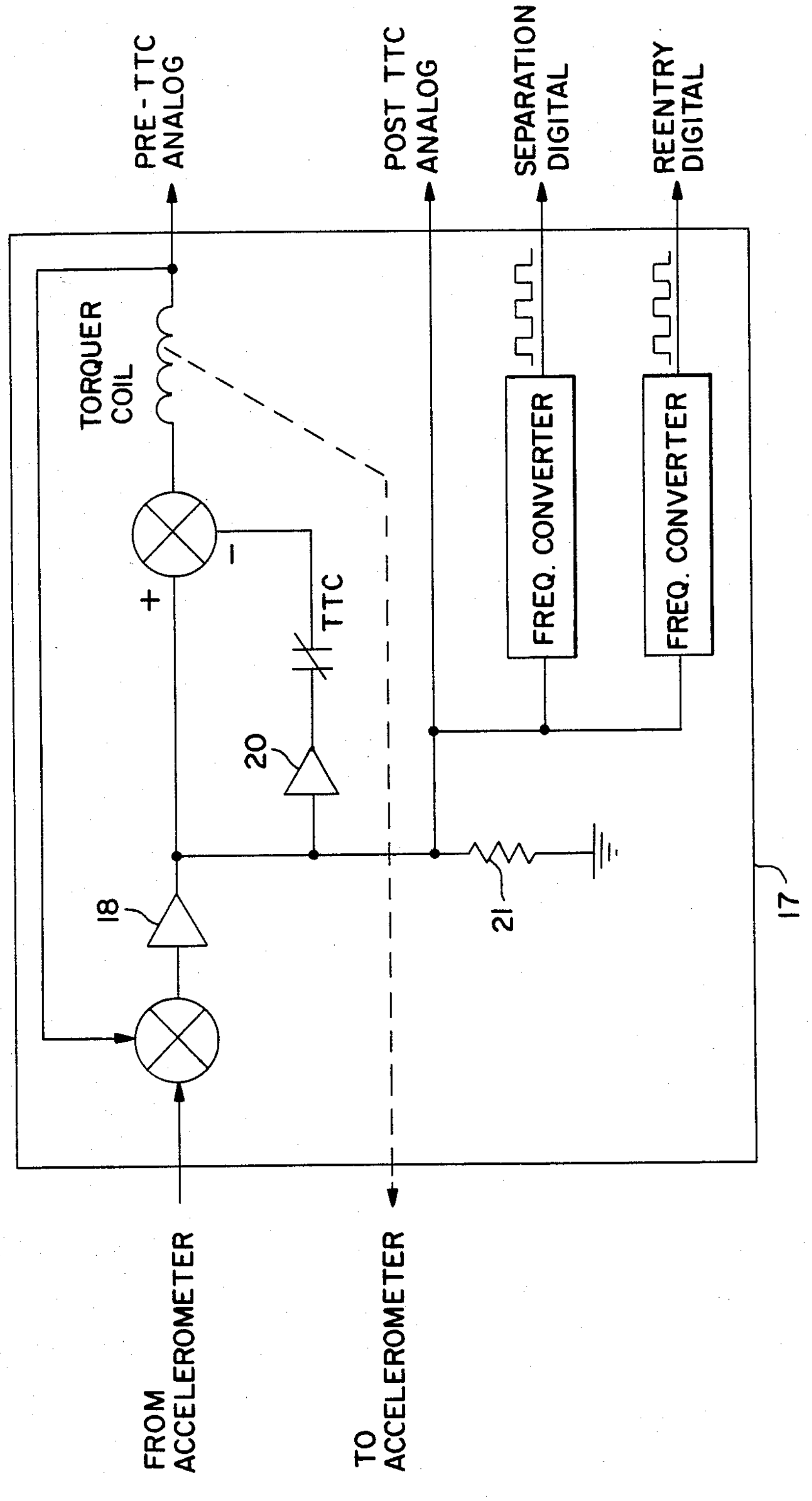
FIG. 4 is a schematic block diagram showing the operation of accelerometer servo electronics in accordance with the invention.

FIG. 4 includes a representation of the servo electronics 17 associated with one of the accelerometers 16, it being understood that three sets of outputs corresponding to the three tri-axial mounted accelerometers 16 are provided. Still referring to FIG. 4, a servo torquer signal is provided and is sampled in order to provide a pre-TTC analog output, where TTC is the thrust termination command. The pre-TTC analog output provides acceleration information during an initial time period. During the initial time period, an auto-zero feedback loop, represented by amplifier 20, provides artificially zeroed readings. These readings are required for in-flight calibration of a post-TTC analog output and a separation digital output. Still referring to FIG. 4, at the event TTC, the auto-zero feedback loop, represented by amplifier 20 opens, causing a step in voltage to be measured at the sense resistor 21. This sensed voltage is proportional to the applied acceleration and is the post-TTC analog output. The voltage is then converted into the separation digital output and a digital output for reentry.

The outputs from the instruments 15 (FIG. 1) are applied to an instrument processing circuit 22 shown in FIG. 3. The instrument processing circuit 22 merely digitalizes analog values and provides appropriate digital values to a microprocessor 23 or similar digital controlling circuit. The microprocessor 23 also controls the instrument processing circuit 22 in order that appropriate outputs from the instrument section 15 are processed by the instrument processing circuit 22 in order to provide the microprocessor 23 with information which has a high degree of accuracy and yet is not off-scale.

With reference to FIG. 1, an event interface circuit 24 is connected to the system for performing events, represented by block 25. The event interface circuit 24 electrically mimics the vehicle's customary equipment. The flight recorder 11 is mounted in the place of the equipment. Such electrical mimicry is typically accomplished by impedances and relays (not shown) which cause the event interface circuit 24 to match the electrical characteristics of the vehicle's equipment. The event interface circuit 24 detects events performed by the vehicle in order that the exact sequence, levels and timing of events may be recorded. The event interface circuit 24 is connected to the microprocessor 23 for recording purposes.

A guidance interface circuit 26 is connected to the vehicle's guidance system, represented by block 27, to provide the microprocessor 23 with information concerning guidance control signals. In order that guidance interface circuit 26 does not interfere with the vehicle's guidance system 27, the guidance interface circuit 26 is isolated from the vehicle's guidance system 27 by an optical isolation circuit 28, included in the guidance interface circuit 26. Both the event interface circuit 24 and the guidance interface circuit 26 provide signals indicating the outputs of the appropriate controls 25, 27 which are being monitored by the interface circuits 24, 26. The interface circuits provide output signals in response to signals received from the system for performing events 25 and by the vehicle guidance system 27. These received signals are typically output voltages and/or currents. In the case of fluid controlled vehicles or vehicles using other types of non-electrical controls, the interface circuits 24, 26 would be responsive to the appropriate control signals and provide electrical output signals to the microprocessor 23. The same guidance control signals that are monitored by the guidance interface 26 are also transmitted, as a telemetry signal DT to a ground based observer via the vehicle's telemetry system 29. The time history of the DT telemetry signal is recorded for use in the ground base analysis task.

Jane's Aerospace Dictionary (Gunston, Jane's Publications, London, 1980) defines telemetry as, "—transmission of real-time data by radio link, e.g. from missile to ground station, today invariably digital and the important to RPG's (remotely piloted vehicles) and unmanned reconnaissance systems. Data can be pressure, velocity, surface angular position or any other instrument output.—" For the purpose of this application, the telemetry signal DT merely functions as a timing reference signal. That occurs concurrently with actual vehicle events in the preferred embodiment.

The guidance interface circuit 26 also provides information to the microprocessor 23 which enables the microprocessor 23 to control the reading and recording of events in accordance with the status of the vehicle's flight as will be described. Alternatively, a firmwire timing and control circuit (not shown) may be provided in order to control the timing of the recording of events. A profile connector (also not shown) may be used to firmwire program such a timing and control circuit.

Referring still to FIG. 1, the microprocessor 23 provides output signals, corresponding to measured data to be recorded, to a flight tape recorder 32. The flight tape recorder 32 is controlled by the microprocessor 23 so as to switch the recorder 32 "on" and "off", as well as to change speeds of the recorder 32.

The flight recorder 11 uses a 28-volt D.C. voltage source such as a battery 34 and a power supply 35 which converts the D.C. voltage to 5-volt logic power and $\pm 15$ volt signal power for use in this system. A voltmeter 36 monitors battery voltage so that changes in the voltage can be later noted and correlated to the results of data acquired at the ground based data analyzer 13. The flight recorder 11 is switched "on" during take off acceleration by a system turn-on circuit 37 which is responsive to said take off acceleration.

After this system is turned on by system turn-on circuit 37, a clock 38 provides a time reference for data received by the microprocessor 23 for recording by the recorder 32. The time reference information is recorded simultaneously with the data on flight tape 12. Flight recorder time zero is referenced to the first DT event.

Figure 5:
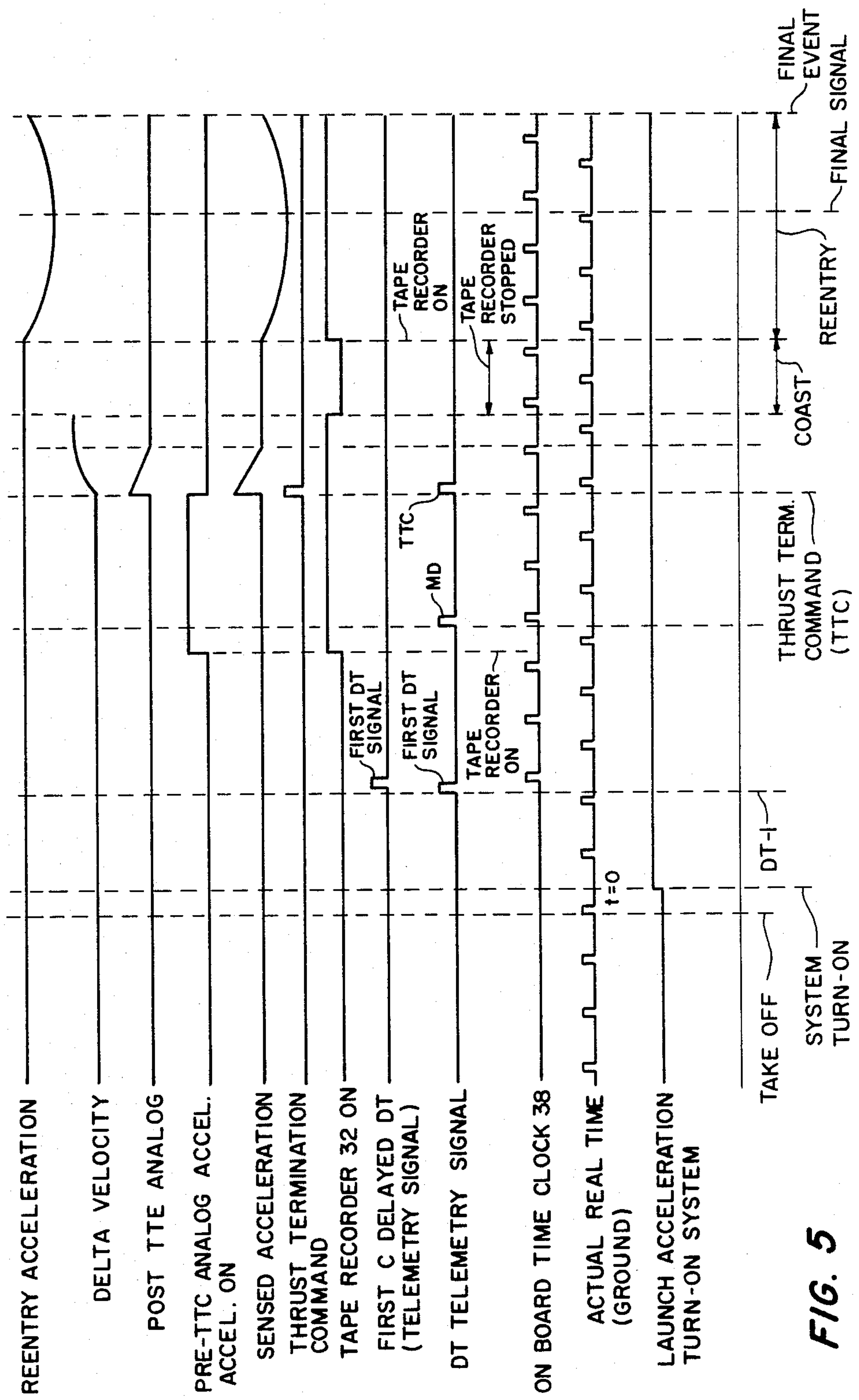
FIG. 5 is a timing diagram showing the relationship of events recorded by the on-board component shown in FIG. 1 and the events occurring during the flight of the vehicle which are used in providing information concerning the flight.

Referring to FIGS. 2 and 5, the information recorded by the flight recorder 11 must be correlated with other time-base data at the ground based data analyzer 13 in order that the recorded information can be properly reconstructed into a history of the flight of the vehicle. In order to do this, the time information provided by clock 38 must be correlated with real time information concerning, inter alia, the time of take off of the vehicle. Other information, such as the observed location of the vehicle at a particular time during its flight, may also be advantageously used.

In FIG. 5, it will be noted that the system is turned on at a system turn-on time which occurs at a time after take off and which may be variable. As noted above, the system is turned on under the influence of some particular take off acceleration by the system turn-on circuit 37, the time of which is indicated by the incremental step on the launch acceleration turn-on line of FIG. 5.

With reference to FIG. 2, when raw data obtained by the flight recorder 11 is to be analyzed, the flight tape 12 is mounted to a reproducer 39 in the ground base data analyzer 13. An interface adapter 40 converts and buffers signals from the reproducer 39 into signals which are compatable with a CPU 41. Externally detected timing inputs, such as DT are supplied to the CPU 41 via a terminal (not shown). It is also possible, although probably not practical, to interpret the outputs manually.

With reference to FIG. 1, the first DT telemetry signal is transmitted by the vehicle's telemetry system 29 and is also recorded by flight recorder 11. The first DT telemetry signal received by a ground tracking station serves as a reference time to correlate the onboard real time clock 38 with reference times, such as the take off time. Referring to FIG. 5, the first DT telemetry signal is received at a time delayed slightly by the time required for the signal to travel at the speed of light, indicated by c-delayed DT. If this time delay is critical, it can be determined by an approximate measurement of the distance of the vehicle from the tracking station plus a determination of the delays in measuring time sensed by the ground-based tracking systems. Further established time delays between guidance command and telemetry transmission may be included in this determination. Thus, the information recorded by the flight recorder 11 can be correlated with additional information provided from ground tracking stations in order to provide a complete record of data which is processed by the data analyzer 13.

Referring again to FIG. 5, during a typical flight of the vehicle during test, there occurs after take off, a series of events which define portions of the flight. As previously mentioned, the first DT telemetry signal is used as a time reference for synchronizing flight recorder 11 with the actual real time of events recorded at a ground tracking station. Subsequent to the transmission of the first DT telemetry signal and after the recorder 32 is turned on, a series of DT signals are issued by the vehicle's guidance system 27. One of these DT signals is a response to the thrust termination command, TTC. Upon receiving TTC the vehicle's thrust is discontinued. After the last of the series of DT signals are issued, the vehicle is in a "coast" or zero acceleration mode. The coast mode is terminated at a given time.

Referring to FIGS. 1 and 5, at a time subsequent to take-off and prior to the TTC command, tape recorder 32 is switched "on" at a first speed in order to record acceleration prior to the TTC command. At that time, the servo electronics 17 provides indications of zero acceleration at the post-TTC outputs of the servo electronics 17, shown as re-entry acceleration, velocity and post-TTC analog in FIG. 5. These zeroed readings have background noise levels which are the equivalent of background noise levels which will be transmitted when the post TTC outputs of the servo electronics 17 provide indications of the actual acceleration. These zeroed outputs are used to provide the ground based data analyzer 13 with the record of background noise which it can use to precisely calibrate the readings of the post-TTC analog outputs and the digital outputs of the servo electronics 17. Further accuracy is established by a thermometer 43 which senses temperature at a close proximity to the accelerometer 16. The sensing of temperature by the thermometer 43 enables the accelerometer output readings to be compensated for by temperature in accordance with data which is empirically obtained prior to the installation of the flight recorder and provided to the ground based data analyzer 13.

After the TTC command, the post-TTC analog output from the servo electronics 17 provides and analog reading, indicated in FIGS. 3 and 4. This post-TTC analog output is recorded for a pre-determined period of time. The tape recorder 32 stops recording at a given time.

Still referring to FIG. 5, after the TTC command and until the tape recorder 32 stops, the separation digital output from the servo electronics 17 is recorded. This digital output is in reality a high frequency pulse train whose frequency is proportional to sensed acceleration. By providing a high degree accuracy and precisely calibrating acceleration, small amounts of acceleration, such as 100 μG's can be detected and recorded at this stage. The tape recorder 32 is re-started at a second speed at a second given time. At that time, a re-entry digital output from the servo electronics 17 is recorded. The re-entry digital output is also a frequency variable pulse train, although it has a different scale than that of the separation digital output.

The zeroing of the separation digital output prior to the TTC command enables that output to provide an indication mimicking acceleration from a zero value, in order to provide a representation of a cumulative change in velocity after the TTC command. Referring to FIG. 5, this cumulative change in velocity is indicated as delta velocity and remains constant during the coast mode. Separation acceleration may be determined by the ground based data analyzer 13 (FIG. 2), with the zeroed output not only providing a stable representation of background level noise but also enabling the proper integration of data from a zero reference point.

Referring to FIG. 3, the instrument processing circuit 32 converts the outputs from the servo electronics 17 into forms which are readily acceptable by the microprocessor 23. Additionally, the instrument processing circuit 22 multiplexes the different outputs from the servo electronics 17 so that, for example, either the separation digital output or the reentry digital output is used, as required.

Referring to FIG. 1, the microprocessor 23 provides the recorder 32 with readings from the guidance interface circuits 26 and the event interface circuit 24 so that events and indications of guidance activity can be recorded by the recorder 32 in synchronism with timing of the acceleration and rate measurements from the dynamic data acquisition circuit 14.

It should be clear to those skilled in the art that variations in the timing of recording of different events and forces are likely to be desired in accordance with differences in the type of mission for which the test of the vehicle is conducted. The microprocessor 23 enables the timing of such recording to be varied in accordance with the requirements of the test without hardware changes. Alternatively, as mentioned before, it is possible to substitute a pulse code modulated data processor (not shown), and a timing and control circuit (not shown) for the microprocessor 23. In that case, the sequencing of events would necessarily be programmed into the system by hardwiring techniques.

A profile connector (not shown) could be used to control the timing and control circuit in accordance with specific timing commands in order to contain some of the hardware programming changes which are expected to be made during testing.

Likewise, other changes to the inventive system can be made by those skilled in the art of constructing test equipment. For example, if the vehicle being tested is a short range missile, there would be different requirements for measuring forces such as acceleration, and the measurements of these forces would be taken in accordance with the requirements of the test. If the inventive system is used to test a different kind of vehicle, it is clear that the type of data recorded would be substantially different. Accordingly, the invention should be construed as limited only by the claims.

What is claimed is:

1. Test equipment for a unit under test characterized by:

(a) means for transmitting a discrete telemetry signal associated with the units;

(b) a first component, associated with the unit, for sensing a plurality of conditions, the first component including:

(i) a clock for providing a timing signal, (ii) a plurality of sensors for providing signals in response to predetermined conditions of the unit under test, and (iii) memory means for storing the signals in coordination with the timing signal;

(iv) means for supplying an indication of the discrete telemetry signal to the memory means;

(c) tracking means for receiving the discrete telemetry signal and for measuring a real time difference between the transmission of the discrete telemetry signal and a separate event observed to occur with the unit under test;

(d) a second component remotely disposed from the first component for receiving the data from the memory means and for providing an indication of the conditions sensed by the first component, the second component including:

(i) means for receiving said real time measurement, and (ii) means for correlating the real time measurement with the information stored in the memory means in order to provide an output relating to the unit under test.

2. Apparatus as described in claim 1 further characterized by the first component including:

(a) an accelerometer providing first signals;

(b) an accelerometer output processing instrument connected to the accelerometer and having two modes of operation, whereby in a first mode, the first signals are converted to second signals representative of a background noise level and in a second mode, the accelerometer output processing instrument provides third signals representative of acceleration combined with the background noise level.

3. Apparatus as described in claim 2 further characterized by:

the accelerometer output processing instrument providing the second and third signals by converting the first signals to a voltage signal such that the difference between the voltage signal in the second mode and the voltage signal in the first mode is proportional to acceleration.

4. Apparatus as described in claim 1 further characterized by:

means for converting the second and third signals to frequency variable signals such that the difference between the frequency derived from the third signal and the frequency derived from the second signal is proportional to acceleration.

5. Apparatus as described in claim 2 further characterized by:

the accelerometer output processing instrument including means for converting the second and third signals to frequency variable signals such that the difference between the frequency derived from the third signal and the frequency derived from the second signal is proportional to acceleration.

6. Apparatus as described in claim 2 further characterized by:

(a) the accelerometer output processing instrument including means for converting the second and third signals to frequency variable signals such that the difference between the frequency derived from the third signal and the frequency derived from the second signal is proportional to acceleration; and (b) the time of change from the first mode to the second mode establishing a zero point with which to determine a total change in velocity by using the third signal.

7. Apparatus as described in claim 1 further characterized by:

the unit under test being an airborne vehicle having a predetermined flight path and the first component being located within the vehicle.

8. Test equipment for a unit under test characterized by:

(a) a first component, associated with the unit, to sense a plurality of conditions, the first component including:

(i) a clock providing a timing signal, (ii) a plurality of sensors providing signals in response to predetermined conditions, (iii) means, connected to at least one of the sensors, for providing an analog signal corresponding to the signal from said one of the sensors, (iv) an analog to digital converter connected to the analog signal means and converting the analog signal into a digital signal, (v) memory means for storing the digital signal in coordination with the timing signal, (vi) means connected to the analog to digital converter and the processing means for controlling the analog to digital converter in order to cause the analog to digital converter to provide the digital signal at selected times, and for providing the signal in digital form to the memory means, and (vii) means for supplying a discrete telemetry signal to the memory means;

(b) tracking means for receiving the distinct telemetry signal and for measuring a real time difference between the transmission of the discrete signal and a separate event occurring with the unit under test; and (c) a second component for receiving the data from the memory means and providing an indication of the conditions, the second component including:

(i) means for receiving real time measurement, and (ii) means for correlating the real time measurement and the information stored in the memory means in order to provide an output of data relating to the unit under test.

9. Test equipment as described by claim 8 further characterized by:

(a) the analog signal representing vehicle acceleration; and (b) the analog to digital converter converting the analog signal to a frequency variable signal.

10. Apparatus as described in claim 8 further characterized by:

the unit under test being an airborne vehicle having a predetermined flight path and the first component being located within the vehicle.

11. Apparatus as described in claim 9 further characterized by:

the unit under test being an airborne vehicle having a predetermined flight path and the first component being located within the vehicle.

12. Apparatus as described in claim 10 further characterized by:

the separate event, occurring with the unit under test, being an observed flight event of the vehicle.

13. Apparatus as described in claim 11 further characterized by:

the separate event, occurring with the unit under test, being an observed flight event of the vehicle.

* * * * *